(12) United States Patent
Reynolds, Jr.

(10) Patent No.: US 7,942,454 B2
(45) Date of Patent: *May 17, 2011

(54) THREADS WITH PERTURBATIONS

(75) Inventor: Harris A. Reynolds, Jr., Houston, TX (US)

(73) Assignee: Hydril Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/721,410

(22) Filed: Mar. 10, 2010

(65) Prior Publication Data

US 2010/0156099 A1 Jun. 24, 2010

Related U.S. Application Data

(63) Continuation of application No. 11/752,646, filed on May 23, 2007, which is a continuation-in-part of application No. 11/027,014, filed on Dec. 30, 2004, now Pat. No. 7,458,616.

(51) Int. Cl.
*F16L 15/00* (2006.01)

(52) U.S. Cl. ........................................ 285/333; 285/334

(58) Field of Classification Search .................. 285/333, 285/334, 391, 390; 411/310, 311
See application file for complete search history.

(56) References Cited

U.S. PATENT DOCUMENTS

| 2,788,046 A * | 4/1957 | Rosan ........................... 411/311 |
| 7,458,616 B2 * | 12/2008 | Reynolds, Jr. ................. 285/333 |

OTHER PUBLICATIONS

Office Action in corresponding U.S. Appl. No. 11/614,655 dated May 20, 2010. 21 pages.
Notice of Allowance issued in related U.S. Appl. No. 11/678,501; dated Jun. 14, 2010 (10 pages).
Notice of Allowance issued in related U.S. Appl. No. 11/752,646; dated Jun. 14, 2010 (6 pages).
Notice of Allowance issued in related U.S. Appl. No. 11/678,501; dated Jul. 6, 2010 (6 pages).
Notice of Allowance issued in related U.S. Appl. No. 11/752,646; dated Jul. 13, 2010 (7 pages).

\* cited by examiner

*Primary Examiner* — David E Bochna
(74) *Attorney, Agent, or Firm* — Osha Liang LLP

(57) ABSTRACT

A threaded connection includes a pin member including a pin thread having a pin thread crest, a pin thread root, a pin load flank, and a pin stab flank, and a box member including a box thread having a box thread crest, a box thread root, a box load flank, and a box stab flank, wherein at least one of the pin thread crest, the pin thread root, the box thread crest, and the box thread root has at least one perturbation formed thereon. Upon a selected make-up of the pin member with the box member, a localized clearance or a localized interference exists between the pin thread and the box thread at the at least one perturbation, wherein the localized clearance between the pin thread and the box thread exists across substantially the entire pin thread crest or substantially the entire box thread crest, and wherein the localized interference between the pin thread and the box thread exists across substantially the entire pin thread crest or substantially the entire box thread crest.

11 Claims, 7 Drawing Sheets

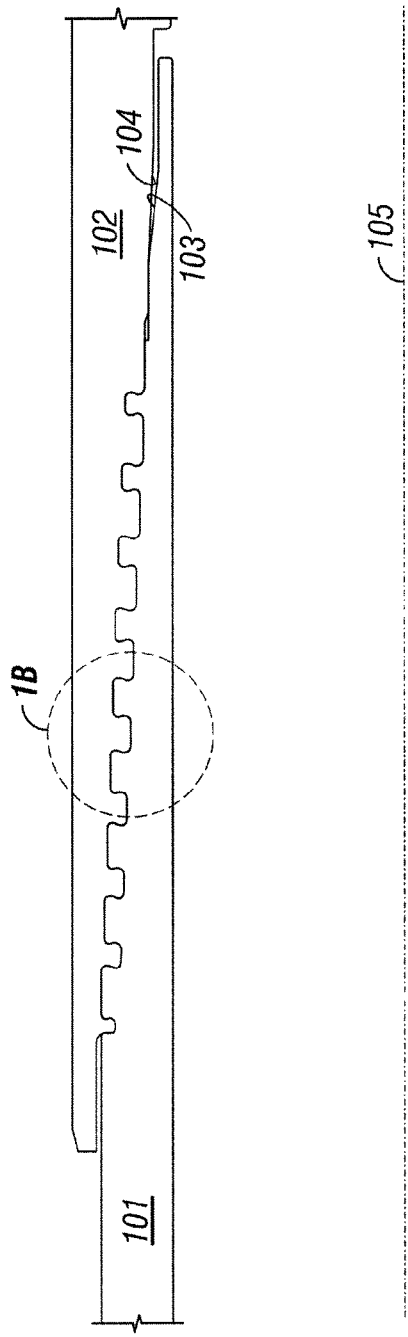
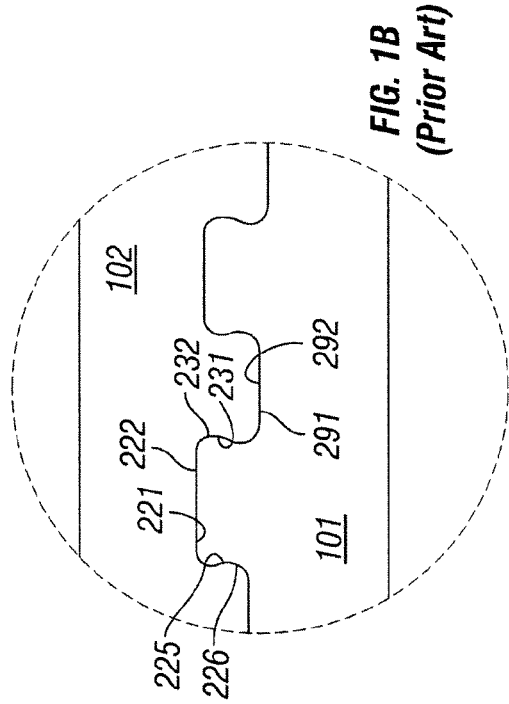
FIG. 1A
(Prior Art)
FIG. 1B
(Prior Art)

THREADS WITH PERTURBATIONS

CROSS-REFERENCE TO RELATED APPLICATIONS

The present application claims the benefit, pursuant to 35 U.S.C. §120, as a continuation application of U.S. patent application Ser. No. 11/752,646, filed May 23, 2007, and entitled "Threads with Perturbations," which was filed as a continuation-in-part of U.S. patent application Ser. No. 11/027,014, filed on Dec. 30, 2004, now U.S. Pat. No. 7,458,616, all of which are hereby expressly incorporated by reference in their entirety.

BACKGROUND OF THE DISCLOSURE

Casing joints, liners, drill pipe, and drill collars (collectively referred to as "tubulars") are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomeric seal (e.g., an o-ring seal), a metal-to-metal seal formed proximate the connection, or similar seals known in the art. In some connections, seals are formed between the internal and external threads. Connections with this characteristic are said to have a "thread seal." As used herein, a "thread seal" means that a seal is formed between at least a portion of the internal thread on the box member and the external thread on the pin member.

It will be understood that certain terms are used herein as they would be conventionally understood where tubular joints are being connected in a vertical position along a central axis of the tubular members such as when making up a pipe string for lowering into a well bore. Thus, the term "load flank" designates the side wall surface of a thread that faces away from the outer end of the respective pin or box member on which the thread is formed and supports the weight (i.e., tensile load) of the lower tubular member hanging in the well bore. The term "stab flank" designates the side wall surface of the thread that faces toward the outer end of the respective pin or box member and supports forces compressing the joints toward each other such as the weight of the upper tubular member during the initial makeup of the joint or such as a force applied to push a lower tubular member against the bottom of a bore hole (i.e., compressive force). The term "face" of the box is the end of the box member facing outward from the box threads and the term "nose" of the pin is the end of the pin member facing outward from the threads of the connection. Upon makeup of a connection the nose of the pin is stabbed into and past the face of the box.

One type of thread commonly used to form a thread seal is a wedge thread. In FIG. 1, a connection having a wedge thread is shown. "Wedge threads" are characterized by threads that increase in width (i.e., axial distance between load flanks 225 and 226 and stab flanks 232 and 231) in opposite directions on the pin member 101 and box member 102. Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present application and incorporated herein by reference. On the pin member 101, the pin thread crest 222 is narrow towards the distal end of the pin member 101 while the box thread crest 291 is wide. Moving along the axis 105 (from right to left), the pin thread crest 222 widens while the box thread crest 291 narrows.

Generally, thread seals are difficult to achieve with free-running threads having broad crests and roots, however, the same thread forms may have thread seals when used for wedge threads. Various thread forms may be used for embodiments of the present disclosure disclosed below. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. An open thread form with a generally rectangular shape is disclosed in U.S. Pat. No. 6,578,880 issued to Watts. Each of the above thread forms are example thread forms that may be used for embodiments of the present disclosure having either wedge threads or free running threads. Those having ordinary skill in the art will appreciate that the teachings contained herein are not limited to particular thread forms.

For wedge threads, a thread seal is accomplished by the contact pressure caused by interference over at least a portion of the connection between the pin load flank 226 and the box load flank 225 and between the pin stab flank 232 and the box stab flank 231, which occurs when the connection is made-up. Close proximity or interference between the roots 292 and 221 and crests 222 and 291 completes the thread seal when it occurs over at least a portion of where the flank interference occurs. Higher pressure may be contained with increased interference between the roots and crests ("root/crest interference") on the pin member 101 and the box member 102 and by increasing flank interference. This particular connection also includes a metal-to-metal seal that is accomplished by contact between corresponding sealing surfaces 103 and 104 locating on the pin member 101 and box member 102, respectively.

A property of wedge threads, which typically do not have a positive stop torque shoulder on the connection, is that the make-up is "indeterminate," and, as a result, the relative position of the pin member and box member varies more for a given torque range to be applied than connections having a positive stop torque shoulder. As used herein, "make-up" refers to threading a pin member and a box member together. "Selected make-up refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For wedge threads that are designed to have root/crest clearance, the clearance decreases as the connection is made-up. Regardless of the design of the wedge thread, corresponding flanks and corresponding roots and crests come closer to each other (i.e. clearance decreases or interference decreases) during make-up. Indeterminate make-up allows for the flank interference and root/crest interference to be increased by increasing the torque on the connection. Thus, a wedge thread may be able to thread seal higher pressures of gas and/or liquid by designing the connection to have more flank interference and/or root/crest interference or by increasing the torque on the connection, however, this also increases stress on the connection during make-up, which could lead to failure during use.

Free-running threads used for oilfield tubular connections typically do not form thread seals when the connection is made-up. FIG. 2 shows a prior art connection having free-running threads. The free-running threads include load flanks 154 and 155, stab flanks 157 and 158, crests 159 and 162, and roots 160 and 161. As is typical of a connection with free-running threads, this connection relies on a positive stop torque shoulder formed by the contact of surfaces 151 and 152 disposed on the pin member 101 and the box member 102, respectively. The positive stop torque shoulder shown in FIG. 2 is commonly referred to as a "pin nose shoulder." In other connections, the positive stop torque shoulder may instead be formed by the box face 163 and a mating shoulder (not shown) on the pin member 101. The positive stop torque shoulder also provides a seal. Unlike wedge threads, which make-up by the wedging of the pin thread and the box thread, free-running threads rely on the positive stop torque shoulder to load the connection during make-up. To make-up the connection shown in FIG. 2, the pin member 101 and the box member 102 are screwed together until the surfaces 151 and 152 are brought into abutment, at which point the pin load flank 154 and box load flank 155 are also in abutment. Additional torque is applied to the pin member 101 and the box member 102 to load the surfaces 151 and 152 and the pin load flank 154 and box load flank 155 until the desired amount of make-up torque has been applied to the connection.

The connection shown in FIG. 2 does not accomplish a thread seal because of the large gap 153 that exists between the pin stab flank 157 and box stab flank 158. The gap 153 occurs because of how free-running threads with positive stop torque shoulders are loaded. Applying torque to the connection during make-up against the positive stop torque shoulder causes the pin member 101 to be compressed while the box member 102 is stretched in tension. Note that when a box face shoulder is used, the box member 102 is compressed while the pin member 101 is stretched in tension. The force between the pin member 101 and the box member 102 is applied through the pin load flank 154 and box load flank 155. The pin stab flank 157 and the box stab flank 158 are not loaded during make-up. This results in contact pressure between the load flanks 154 and 155 and a gap between stab flanks 157 and 158. As discussed above, a wedge thread (as shown in FIG. 1) is able to form a thread seal in part because of the interference between the load flanks 225 and 226 and the stab flanks 232 and 231. For wedge threads, this occurs near the end of the make-up of the connection because of the varying width of the pin thread and the box thread. To have similar interference between the load flanks 154 and 155 and stab flanks 157 and 158 on a cylindrical (i.e. non-tapered) free-running thread, the interference would exist substantially throughout the make-up of the connection because the pin thread and the box thread have a continuous width. Further, root/crest interference, if any, would exist substantially throughout the make-up of the connection. This could lead to galling of the threads and difficulty in making up the connection.

The variance in thread width for a wedge thread occurs as a result of the load flanks having different leads than the stab flanks. A thread lead may be quantified in inches per revolution. Note that this is the inverse of a commonly used term "thread pitch," which is commonly quantified as threads per inch. A graph of the leads for a prior art wedge thread is shown in FIG. 3A. For this connection, the load lead 14 is constant over the length of the connection and greater than the stab lead 12, which is also constant. The nominal lead is shown as item 10. As used herein, "nominal lead" refers to the average of the load lead 14 and the stab lead 12. The thread will widen with each revolution by the difference in the load lead 14 and the stab lead 12. The difference in the load lead 14 and the stab lead 12 is sometimes referred to as the "wedge ratio." For a free-running thread (i.e. non-wedge thead), the load lead 14 and the stab lead 12 would be substantially equal causing the free-running thread to have a substantially constant thread width (i.e. a zero wedge ratio).

Generally, a thread is cut on a tubular using a substantially constant thread lead (including the load lead and the stab lead), however, some variance in the thread lead occurs during the manufacturing process, which is typically includes machining with a mill or lathe. During machining, the variance in the thread lead manifests as a slight periodic variation in the thread lead above and below the intended value for the thread lead. This phenomenon is commonly referred to as "thread drunkenness." The amount of thread drunkenness that occurs is largely dependent on the machine being used. It may be caused by slop or backlash in the machine tool that is cutting the thread. The material being machined and the dimensions of the part being machined are also variables that affect the amount of thread drunkenness. Thread drunkenness can also occur as a result of the electronic controls "hunting" the location for the machine tool. Typically, thread drunkenness is on the order of 0.00005 inch to 0.0005 inch from nominal and is not visible to the eye. The period of the thread drunkenness is typically at least once per thread turn. Greater than normal thread drunkenness is visible as "chatter on the thread surface and may result in the connection being scrapped. Generally, manufacturers try to eliminate any variations from nominal, such as experienced with thread drunkenness.

Intentional variances in thread leads have been disclosed in the prior art for the purposes of load distribution, however, the present inventor is unaware of variances in thread leads to form a thread seal for a wedge thread or a free-running thread. One example of a varied thread lead for stress distribution is disclosed in U.S. Pat. No. 4,582,348 issued to Dearden, et al. That patent is incorporated herein by reference in its entirety. Dearden discloses a connection with free-running threads that has the pin thread and box thread divided into three portions with different leads (note that Dearden refers to thread pitch, which is quantified as threads per inch). In FIG. 3B, a graph of the thread leads for the box member and the pin member is shown. As shown in the graph, at one end of the connection, the pin thread lead 21 is larger than the box thread lead 22. In the intermediate portion 23, the pin thread lead 21 and box thread lead 22 are substantially equal. Then, at the other end of the connection, the box thread lead 22 is larger than the pin thread lead 21. In Dearden, the changes in the pin thread lead 21 and box thread lead 22 are step changes (i.e. substantially instantaneous changes in the lead). The varied thread leads disclosed by Dearden are intended to distribute loading across a greater portion of the connection, and have no effect on the inability of the free-running threads to form a thread seal. Dearden does not disclose varying a load lead or stab lead independent of each other.

Another connection is disclosed in U.S. Pat. No. 6,976,711 entitled "Threaded Connection Especially for Radially Plastically Expandable Conduit," ("Sivley") and assigned to the assignee of the present disclosure. That application is incorporated herein by reference in its entirety. Sivley discloses connections having a variance in load lead and/or stab lead on one or both of the pin member and the box member. A graph of an embodiment disclosed by Sivley is shown in FIG. 3C. Sivley discloses varying the load lead 14 relative to the stab lead 12 at a selected rate over at least a portion of the pin thread and/or box thread. In FIG. 3C, the connection is a wedge thread as shown by the difference between the load lead 14 and the stab lead 12. The load lead 14 and the stab lead 12 converge at a linear rate towards the end of the thread. Sivley discloses various other embodiments having load leads 14 and stab leads 12 that vary at linear rates relative to each other. The variance in the thread leads distributes the loads experienced by the connection over the length of the connection.

In the prior art, free-running threads suitable for oilfield tubulars fail to provide thread seals suitable for the pressure differentials experienced by the tubulars in the downhole environment. Wedge threads provide thread seals, but have difficulty sealing gases, which are more difficult to seal than fluids. Also, any improvement in the thread seal is generally desirable. What is still needed is a thread seal for free-running threads and an improved thread seal for wedge threads.

SUMMARY OF THE CLAIMED SUBJECT MATTER

In one aspect, embodiments disclosed herein relate to a threaded connection including a pin member including a pin thread having a pin thread crest, a pin thread root, a pin load flank, and a pin stab flank, and a box member including a box thread having a box thread crest, a box thread root, a box load flank, and a box stab flank, wherein at least one of the pin thread crest, the pin thread root, the box thread crest, and the box thread root has at least one perturbation formed thereon. Upon a selected make-up of the pin member with the box member, a localized clearance or a localized interference exists between the pin thread and the box thread at the at least one perturbation, wherein the localized clearance between the pin thread and the box thread exists across substantially the entire pin thread crest or substantially the entire box thread crest, and wherein the localized interference between the pin thread and the box thread exists across substantially the entire pin thread crest or substantially the entire box thread crest.

In other aspects, embodiments disclosed herein relate to a threaded connection including a pin member including a pin thread having a pin thread crest, a pin thread root, a pin load flank, and a pin stab flank, and a box member comprising a box thread having a box thread crest, a box thread root, a box load flank, and a box stab flank, wherein at least one of the pin thread crest, the pin thread root, the box thread crest, and the box thread root has at least one perturbation formed thereon. Upon a selected make-up of the pin member with the box member, a localized reduction in clearance or a localized increase in interference exists between the pin thread and the box thread at the at least one perturbation, wherein the localized reduction in clearance between the pin thread and the box thread exists across substantially the entire pin thread crest or substantially the entire box thread crest, and wherein the localized increase in interference between the pin thread and the box thread exists across substantially the entire pin thread crest or substantially the entire box thread crest.

In other aspects, embodiments disclosed herein relate to a threaded connection including a pin member including a pin thread having a pin thread crest, a pin thread root, a pin load flank, and a pin stab flank, and a box member including a box thread having a box thread crest, a box thread root, a box load flank, and a box stab flank, wherein at least one of the pin thread crest, the pin thread root, the box thread crest, and the box thread root has at least one perturbation formed thereon. Upon a selected make-up of the pin member with the box member, a localized increase in clearance or a localized reduction in interference exists between the pin thread and the box thread at the at least one perturbation, wherein the localized increase in clearance between the pin thread and the box thread exists across substantially the entire pin thread crest or substantially the entire box thread crest, and wherein the localized reduction in interference between the pin thread and the box thread exists across substantially the entire pin thread crest or substantially the entire box thread crest.

Other aspects and advantages of the present disclosure will be apparent from the following description and the appended claims.

BRIEF DESCRIPTION OF DRAWINGS

FIGS. 1A and 1B show a cross section of a prior art connection having a wedge thread.

DETAILED DESCRIPTION

The present disclosure relates to threads for tubulars. More specifically, the present disclosure relates to threads having increased contact pressure between portions of the pin thread and the box thread.

For the purpose of clarity, several terms are explicitly defined below. As used herein, "a thread lead" refers generally to the group of leads consisting of the load lead, the stab lead, and the nominal lead.

As used herein, "perturbation" refers to a deviation in an original path of the load flank lead or the stab flank lead on the thread such that a bump is formed thereon. After the perturbation, the path returns at least partially towards the original path prior to the perturbation. Furthermore, the term "perturbation" may also refer to a deviation in an original path of the root or crest of a thread such that a the amount of clearance and/or interference between roots and crests of corresponding threaded members upon selected makeup is changed at the location of the perturbation, when compared to the remainder of the helical length of the non-perturbed threaded connection. In the case of tapered threads, the original path for the roots and/or crests would be along the taper, such that the perturbations would be deviations from the conical taper of the treaded connection.

As used herein, "helical length" refers to the number of turns of the thread that the contactor is disposed, and may be expressed in the number of degrees about the axis of the tubular (i.e. 360 degrees is one thread pitch).

Embodiments of the present disclosure have variations in at least one thread lead over at least a portion of a thread such that contact pressure between mating load flanks and/or mating stab flanks varies. Some embodiments may also vary the height of a thread (as measured from root to crest) in order to form a thread seal. Increases in contact pressure increases the maximum sealing pressure that may be achieved by the thread seal at the location of the perturbation. Decreases in contact pressure may be used to provide locations for an increased amount of thread lubricant to remain between the pin thread and the box thread after make-up of the connection.

Figure 4A:
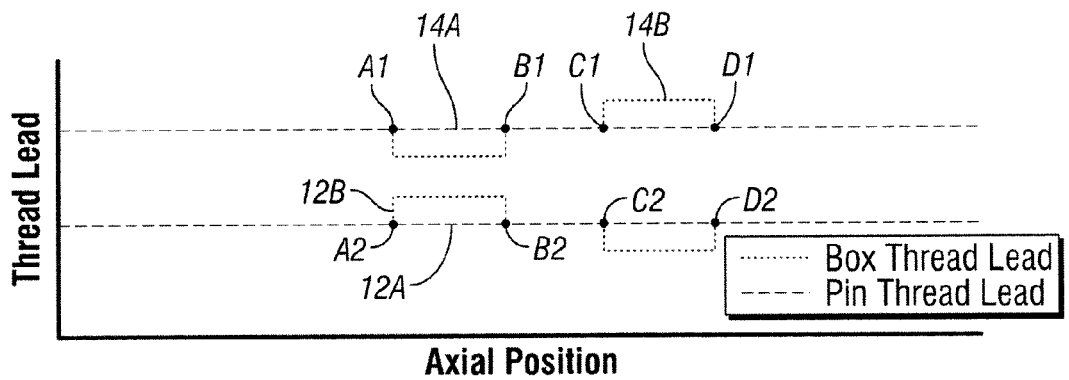
FIG. 4A shows a graph of thread leads in accordance with one embodiment of the present disclosure.
Figure 4B:
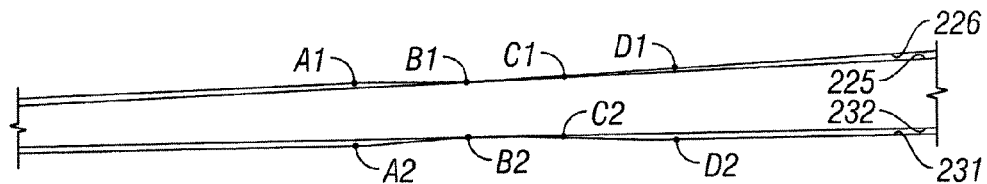
FIG. 4B shows a portion of unwrapped threads corresponding with the graph shown in FIG. 4A.

Turning to FIG. 4A, a graph of thread leads versus axial position in accordance with one embodiment of the present disclosure is shown. FIG. 4B shows an unwrapped wedge thread corresponding to the graph in FIG. 4A. The graph in FIG. 4A shows the box load lead 14B and box stab lead 12B relative to pin load lead 14A and pin stab lead 12A. In this embodiment, the pin thread has a substantially constant load lead 14A and stab lead 12A over the illustrated portion, while the box thread has perturbations caused by variances in the load lead 14B and stab lead 12B. Those having ordinary skill in the art will appreciate that, in another embodiment, the perturbations may instead be located on the pin thread.

In FIG. 4A, a perturbation of the box thread begins at points A1 and A2 where the box load lead 14B decreases and the box stab lead 12B increases. The corresponding change in the shape of the thread is shown in FIG. 4B. At points A1 and A2, the box load flank 226 and box stab flank 231 begin to "pinch" the pin thread. At points B1 and B2, the box load lead 14B and the box stab lead 12B return to the original values. This continues for a selected helical length resulting in a portion of the box thread and pin thread at which increased contact pressure exists when the connection is made-up. At points C1 and C2, the box load lead 14B increases and the box stab lead 12B decreases. Between points C1, C2 and points D1, D2, the box load flank 226 and the box stab flank 231 substantially return to the original path prior to the start of the perturbation. In one embodiment, one or both of the box load flank 226 and the box stab flank 231 may not return fully to the original path. Further, in one embodiment, the maximum value and the minimum value in thread lead changes may not be equal in magnitude. For example, a thread lead may increase by "x" over the original thread lead for a helical length "L." To return to the original path, the same thread lead may decrease by ½*x under the original thread lead for a helical length 2 L. Those having ordinary skill in the art will appreciate that numerous variations of perturbations may be derived without departing from the scope of the present disclosure. In one embodiment, the perturbation may have a helical length that is less than about 360 degrees. In another embodiment, the perturbation may have a helical length that is less than about 180 degrees.

FIGS. 4A and 4B provide an exaggerated example of a thread perturbation for illustrative purposes. The wedge thread in FIG. 4B is partially made-up such that the only point of contact between the load flanks 225 and 226 and the stab flanks 231 and 232 is at the perturbation between points B1, B2 and points C1, C2. The gap between the load flanks 225 and 226 and the stab flanks 231 and 232 is exaggerated to be visible in FIG. 4B. In one embodiment, the change in the thread lead and the helical length at which it continues may be selected such that the perturbation is between about 0.0005 inch and about 0.005 inch in size. In another embodiment, the perturbation may be between about 0.001 inch and about 0.002 inch in size. As the connection in FIG. 4B is made-up past the initial contact at the perturbation, the gap between the load flanks 225 and 226 and the stab flanks 231 and 232 will disappear as the contact pressure at the perturbations locally deforms the thread. After the connection has been made-up to a desired torque or relative position of the pin member and the box member, greater contact pressure will exist between the load flanks 225 and 226 and the stab flanks 231 and 232 at the perturbations in FIG. 4B between points A1, A2 and points D1, D2 than the remaining portions of the threads.

The helical length of each perturbation may vary as desired, however, the manufacturing method may limit the variability of the helical length. For example, in one embodiment, a computer numerically controlled ("CNC") lathe may be used. CNC machines may be controlled by CNC programs. Typically, the CNC program consists of positions for each axis of control. For example, if the CNC lathe has an axial position and a rotational position, the program would have an axial position value corresponding with each rotational position. Because a CNC lathe is usually rotating at a set speed measured in rotations per minute ("RPM"), the CNC program typically has the rotational positions in order and at set increments as the part is rotated in the machine. The increments at which the rotational positions are spaced is commonly referred to as the "resolution" of the lathe. For example, if the resolution is about 90 degrees, a data point will exist for each sequential increment of about 90 degrees. An axial position would be selected for each increment. Typically, the CNC lathe will move the axial position at a substantially constant speed between points. The speed is selected as required to reach the next axial position at substantially the same time as the corresponding rotational position. The thread lead can be selected by calculating the value for the increments such that for each revolution, the axial position advances by a distance substantially equal to the thread lead. For example, a lead of 1 inch per revolution would advance by a ¼ inch every 90 degrees. Those having ordinary skill in the art will be able to apply the above teachings for use with other manufacturing methods. For example, a CNC mill having 4 axes of control (X, Y, Z, and rotational) may be used.

The resolution of the machine used may limit the minimum helical length of a perturbation. Continuing with the 90 degree example, the minimum perturbation would be about 180 degrees (90 degrees of increased lead, 90 degrees of decreased lead). If the maximum contact pressure is desired over an extended length (similar to FIGS. 4A and 4B), then the minimum helical length of the perturbation would be about 270 degrees (90 degrees increased lead, 90 degrees at original lead, 90 degrees at decreased lead). Higher resolution (i.e. smaller rotational increments) allows for greater variability in the helical length of the perturbation. Those having ordinary skill in the art will appreciate that machines with higher or lower resolution may be used to form the perturbations without departing from the scope of the present disclosure.

Figure 5A:
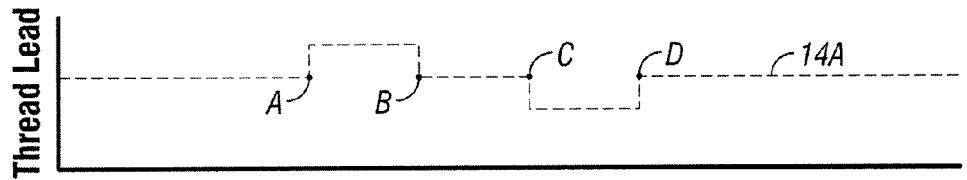
FIG. 5A shows a graph of a thread lead in accordance with one embodiment of the present disclosure.
Figure 5B:
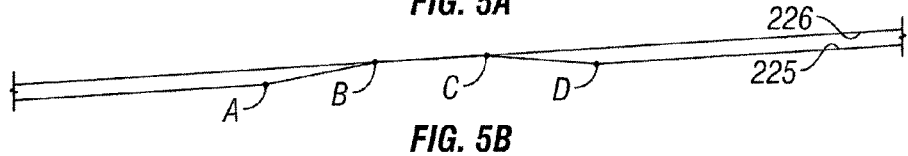
FIGS. 5B and 5C show a portion of unwrapped threads corresponding with the graph shown in FIG. 5A.
Figure 5C:
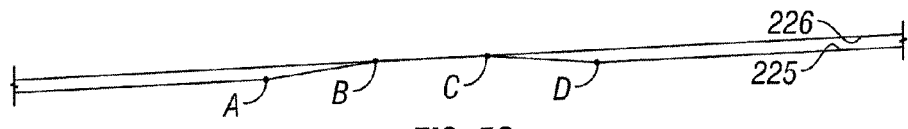

The manufacturing method used, and in particular the specific machine, to form the threads with perturbations will affect the actual shape and size of the perturbations. FIG. 5A shows a graph of a pin load lead 14A relative to axial position in accordance with one embodiment of the present disclosure. FIG. 5B shows the idealized shape of the perturbation corresponding to the graph in FIG. 5A, while FIG. 5C shows what may be the actual shape of the perturbation as a result of the machine used. In FIG. 5A, the pin load lead 14A increases by a selected amount at point A to achieve increased contact pressure between the pin load flank 225 and the box load flank 226. Then, the pin load lead 14A returns to the original pin load lead 14A at point B. At point C, the pin load lead 14A decreases by about the same amount as the previous increase to return the pin load flank 225 to about its original path at point D. Ideally, the pin load flank 225 corresponding to the graph of the pin load lead 14A in FIG. 5A would be substantially as shown in FIG. 5B. In FIG. 5B, the pin load flank 225 changes instantaneously at point A and at a constant linear slope (about equal to the change in pin load lead 14A shown in FIG. 5A) until point B. Then at point C, the pin load flank 225 begins to return to its original path until point D. Momentum of the moving parts and response time in the controls may result in a more smoothed out perturbation as shown in FIG. 5C. In some embodiments, the curvature may be substantially sinusoidal. Although the precise shape of the perturbation may vary by production method, the benefits of the increased contact pressure may still be realized.

In one embodiment, a perturbation may be formed during the finishing pass ("skim cut") of the thread. As used herein, a skim cut refers to a cut on a thread subsequent to a first cut. Typically, a skim cut removes 0.020 inches or less of material. Because less material is removed during the skim cut, higher machining tolerances for the size of the perturbation may be achieved. It should be noted, however, that the machined perturbation may be smaller in size than what was coded into the CNC program. This is largely due to push-off of the machine tool from the thread while cutting. As a result, if a 0.002 inch perturbation is coded into the CNC program, the actual perturbation may be only 0.00075 inch. Those having ordinary skill in the art will appreciate that the characteristics of the particular machine will result in variances between the perturbation that is input and the resulting perturbation size. This discrepancy may be corrected for a selected machine by increasing the size of the input perturbations to result in the desired perturbation size when the accuracy of the selected machine is known.

Figure 6A:
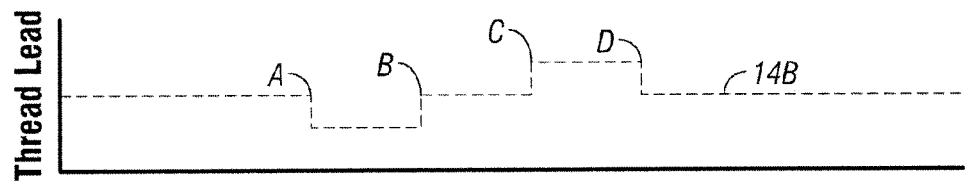
FIG. 6A shows a graph of a thread lead in accordance with one embodiment of the present disclosure.
Figure 6B:
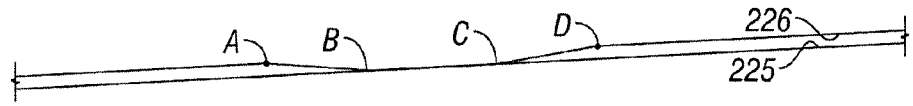
FIG. 6B shows a portion of unwrapped threads corresponding with the graph shown in FIG. 6A.

Turning to FIG. 6A, a graph of a box load lead 14B relative to axial position is shown in accordance with one embodiment of the present disclosure. FIG. 6B shows the corresponding box load flank 226. In FIG. 6B, the shape of the perturbation is slightly curved as a result of the machine used to form the thread. To achieve increased contact pressure between the pin load flank 225 and the box load flank 226, the box load lead 14B decreases at point A. Note that this is the inverse of FIG. 5A, which changed the pin load lead 14A to form the perturbation. Viewing FIGS. 5A and 6A relative to each other shows that either the pin thread or box thread may have a perturbation to achieve and increased contact pressure at a selected location on the threads. Reducing the box load lead 14B achieves substantially the same result as increasing the pin load lead 14A. As shown in FIG. 4A, the change in stab leads 12A and 12B is the inverse of the load leads 14A and 14B. For example, to have perturbations on the pin load flank 225 and the pin stab flank 232 in one embodiment, the pin load lead 14A may increase and the pin stab lead 12A may decrease at about the same axial position. Essentially, the pin thread would widen causing increased contact pressure between the neighboring box thread. To have substantially the same effect by having perturbations on the box member, the box load lead 14B may decrease and the box stab lead 12 may decrease as shown in FIG. 4A.

Figure 7A:
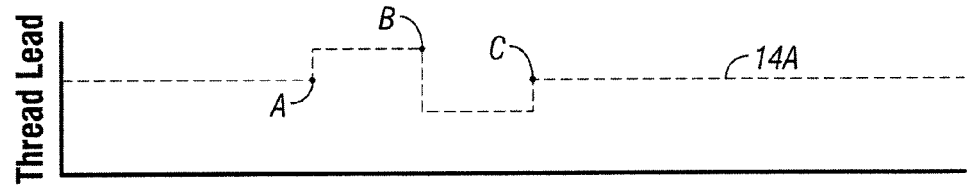
FIG. 7A shows a graph of a thread lead in accordance with one embodiment of the present disclosure.
Figure 7B:
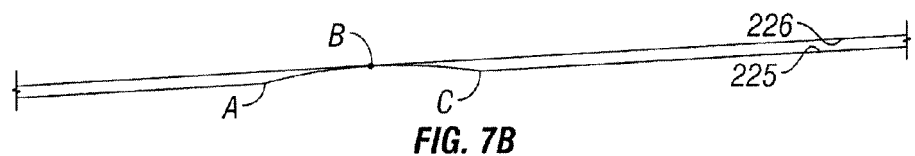
FIG. 7B shows a portion of unwrapped threads corresponding with the graph shown in FIG. 7A.

In FIGS. 7A and 7B, a perturbation in accordance with one embodiment of the present disclosure is shown. FIG. 7A shows a graph of the pin load lead 14A, and FIG. 7B shows the corresponding perturbation on the pin load flank 225. In this embodiment, the pin load lead 14A increases at point A by a selected amount. At point B, the pin load lead 14A decreases by about the same selected amount below the original pin load lead 14A. The perturbation ends at point C where the pin load flank 225 returns to about its original path. The corresponding perturbation shown in FIG. 7B resembles a rounded bump.

Figure 8:
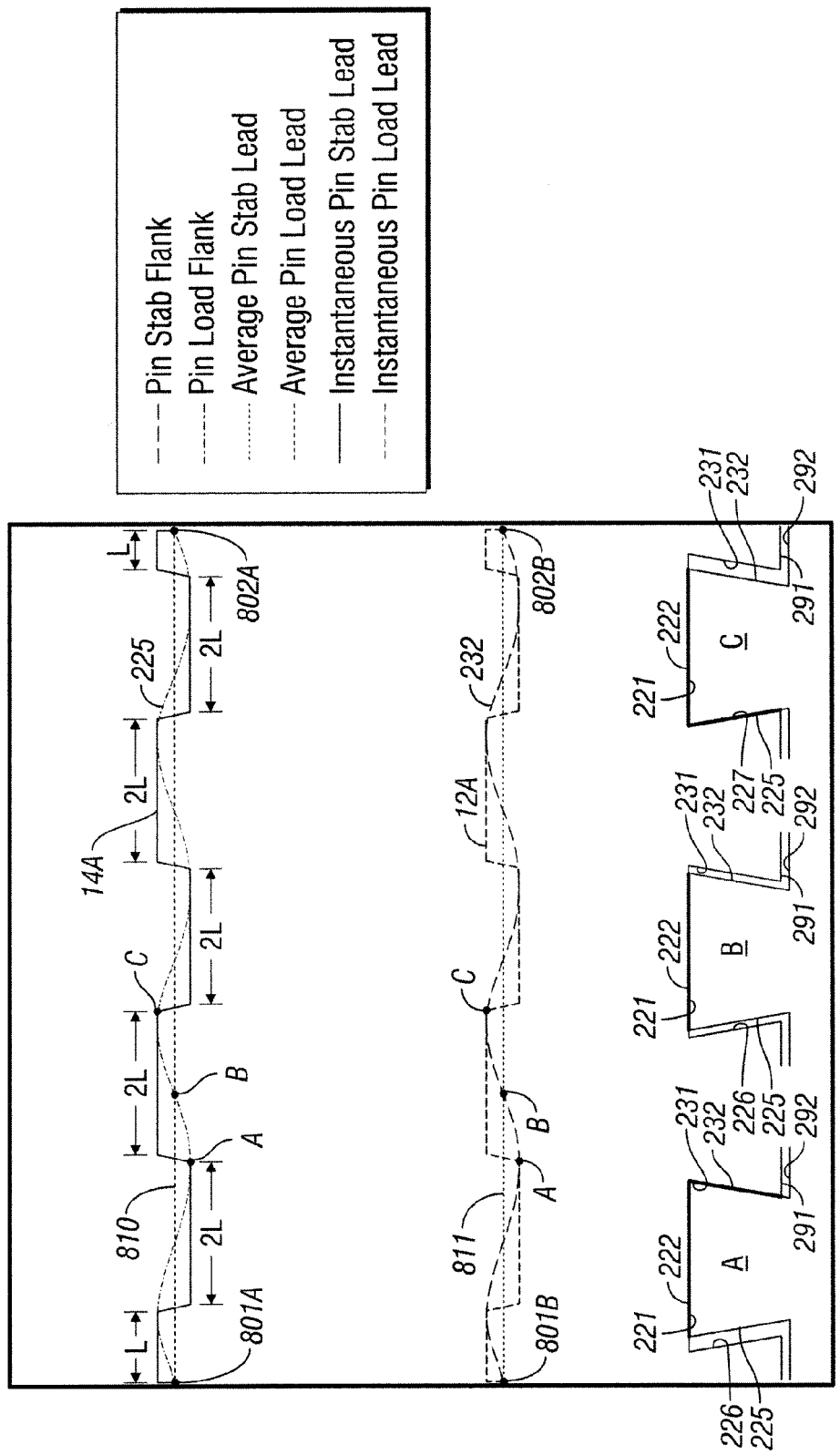
FIG. 8 shows a graph of thread leads with corresponding cross sections of threads in accordance with one embodiment of the present disclosure.

Turning to FIG. 8, multiple perturbations in accordance with one embodiment of the present disclosure are shown. FIG. 8 includes a graph the pin load lead 14A and the pin stab lead 12A. The embodiment shown in FIG. 8 may be referred to as "induced thread drunkenness" because it resembles the wobbling effect of machining as discussed above. Thread drunkenness may be "induced" by programming thread lead changes into the CNC program. In FIG. 8, the induced thread drunkenness begins at points 801A and 801B where both the pin load lead 14A (termed as "instantaneous pin load lead" in this embodiment) and the pin stab lead 12A (termed as "instantaneous box load lead" in this embodiment) begin to vary upward and downward, which results in a rippled pin load flank 225 and pin stab flank 232. To have even positive and negative drunkenness, the initial increase in pin load lead 14A and pin stab lead 12A may have a helical length of L, then the subsequent decrease in pin load lead 14A and pin stab lead 12A may have a helical length of 2L such that the pin load flank 225 and pin stab flank 232 cross their original paths. To return to the original paths at point 802A and 802B, the total increases in pin load lead 14A and pin stab lead 12A multiplied by the helical lengths of the heightened thread leads should substantially equal the total decreases in pin load lead 14A and pin stab lead 12A multiplied by the helical lengths.

For example, in FIG. 8, the pin load lead 14A and pin stab lead 12A are less than the average pin load lead 810 and the average pin stab lead 811, respectively, for a total of 5L in helical length. The pin load flank 225 and pin stab flank 232 return to their original paths at points 802A and 802B after the pin load lead 14A and pin stab lead 12A have been above the average pin load lead 810 and the average pin stab lead 811, respectively, for a total of 5L in helical length. Those having ordinary skill in the art will appreciate that the helical lengths may not need to be equivalent if at any point the absolute values of decreases or increases in the pin load lead 14A and pin stab lead 12A are not equal. For example, in one embodiment, increases in the pin load lead 14A may be about 0.002 inch per revolution above the average pin load lead 810, and decreases in the pin load lead 14A may be about 0.001 inch per revolution below the average pin load lead 810. In that embodiment, the helical length of decreases in the pin load lead 14A may be about twice as much as the helical length of increases in the pin load lead 14A to return to the original path of the pin load flank 225. In other words, some embodiments of the present disclosure may vary asymmetrically from nominal. Those having ordinary skill in the art will appreciate that the increases and decreases in the thread leads, as well as their respective helical lengths, may vary without departing from the scope of the present disclosure. Further, embodiments of the present disclosure may have perturbations that do not fully return to their original paths.

Continuing with FIG. 8, cross sections of threads corresponding to the graph are shown. The cross sections are labeled A, B, and C, which corresponds to points A, B, and C on the graph. The wedge thread in FIG. 4B is partially made-up such that the only point of contact between the load flanks 225 and 226 and the stab flanks 231 and 232 is at the perturbations. In this particular embodiment, the positive and negative perturbations are equal in absolute value such that contact occurs at each maximum and minimum of the perturbations at substantially the same make-up position. This contact is shown in cross sections A and C, which are at a local minimum and local maximum, respectively. At the local minimums of the perturbations (cross section A), the stab flanks 231 and 232 are in contact. At the local maximums of the perturbations (cross section C), the load flanks 225 and 226 are in contact. At the average pin load lead 810 and average pin load lead 811 (i.e. original paths), the gaps between the load flanks 225 and 226 and the stab flanks 231 and 232 may be substantially equal, which is shown in cross section B.

As the connection in FIG. 8 is made-up past the initial contact at the perturbations, the gap between the load flanks 225 and 226 and the stab flanks 231 and 232 will disappear as the contact pressure at the perturbations locally deform the thread. After the connection has been made-up to a desired torque or relative position of the pin member and the box member, greater contact pressure will exist between the load flanks 225 and 226 and the stab flanks 231 and 232 at the maximums and minimums of the perturbations than the remaining portions of the threads. Also, as previously discussed, the gap between the roots 292 and 221 and crests 291 and 222, respectively, will also decrease or close completely when the connection is made-up.

Figure 9:
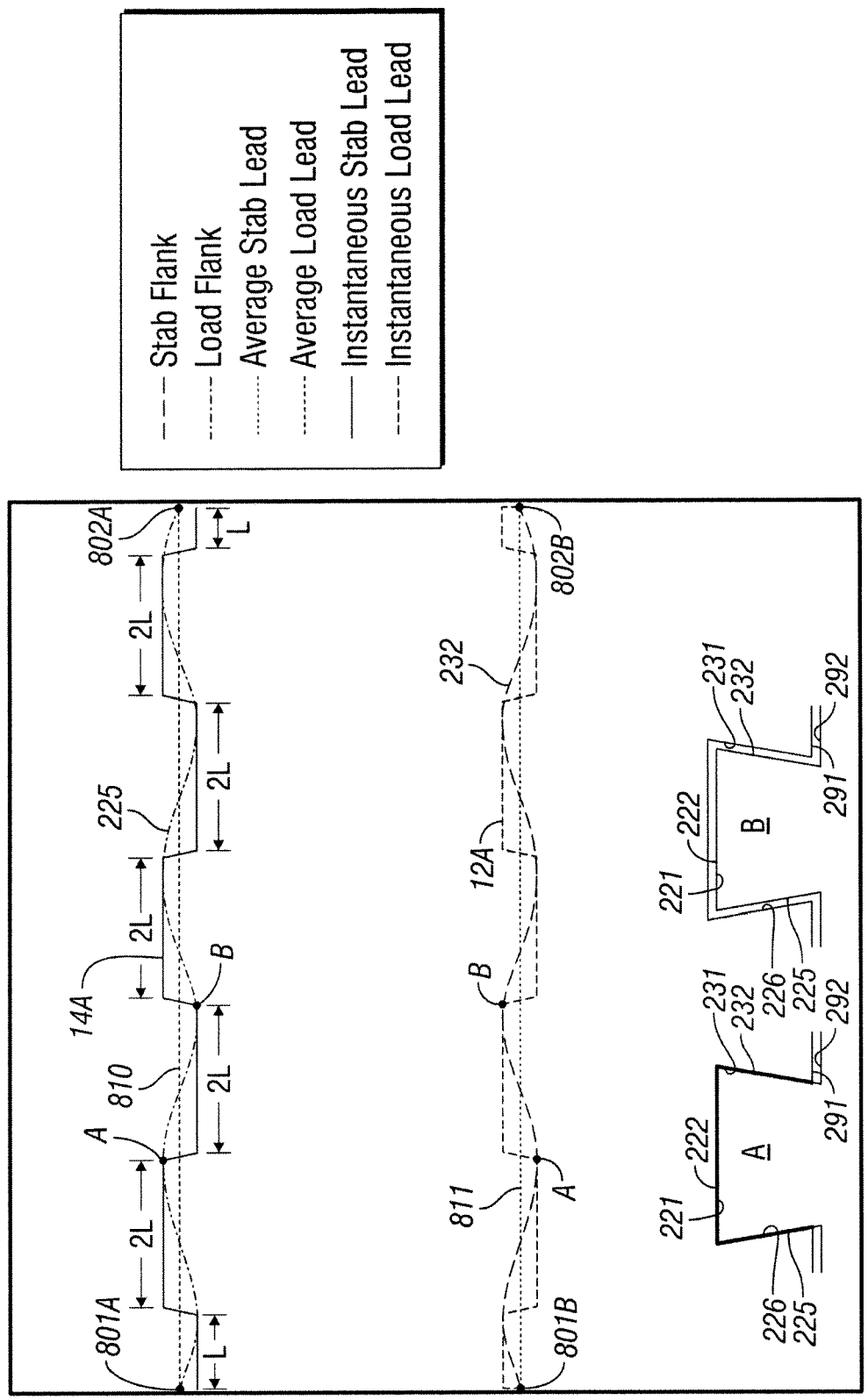
FIG. 9 shows a graph of thread leads with corresponding cross sections of threads in accordance with one embodiment of the present disclosure.

Turning to FIG. 9, multiple perturbations in accordance with one embodiment of the present disclosure are shown. FIG. 9 includes a graph the pin load lead 14A and the pin stab lead 12A. The embodiment shown in FIG. 9 is similar to the "induced thread drunkenness" shown in FIG. 8, except that the pin load lead 14A and the pin stab lead 12A do not increase and decrease in unison. Instead, the pin load lead 14A and the pin stab lead 12A increase and decrease at opposing locations such that the pin thread widens and narrows with each of the perturbations. In other words, in this embodiment, the pin load lead 14A is greater than the average load lead 810 at substantially the same locations where the pin stab lead 12A is less than the average stab lead 811. An increase in the pin load lead 14A combined with a decrease in the pin stab lead 12A widens the thread (see cross section A), while a decrease in the pin load lead 14A combined with an increase in the pin stab lead 12A narrows the thread (see cross section B). During make-up of the connection, contact between the flanks would occur at the increased width portions as shown in cross section A. When the contact occurs at the wider portions, gaps between the flanks would still exist in the narrower portions as shown in cross section B. Upon selected make-up of the connection, substantially all of the gaps between the flanks will disappear, and the connection will have increased contact pressure between the flanks at the wider portions.

Embodiments of the present disclosure may also have variable thread heights (i.e. perturbations on a root and/or a crest) on the pin member and/or the box member. The embodiment shown in FIG. 9 includes a variance in the pin thread height. In that particular embodiment, the pin thread height increases at about the same locations as increases in the pin thread width causing interference between the box thread root 221 and the pin thread crests 222, as shown in cross section A when compared to cross section B.

Thus, a threaded connection having clearance between corresponding roots and crests at selected makeup may be constructed such that root and/or crest perturbations create localized portions of interference or reduced clearance. Particularly, it may be undesirable to constructs a threaded connection with interference or reduced clearance throughout the entire connection because such a construction may lead to premature failure of the connection.

Furthermore, threaded connections characterized as having root/crest interference may be constructed such that root and/or crest perturbations create localized portions of clearance or reduced interference. Particularly, in the case of localized portions of clearance in a threaded otherwise exhibiting root/crest interference at selected makeup, one of ordinary skill in the art may appreciate that such localized clearance portions may be useful as entrapment volumes for thread compound flowing during make-up of the threaded connection.

Figure 2:
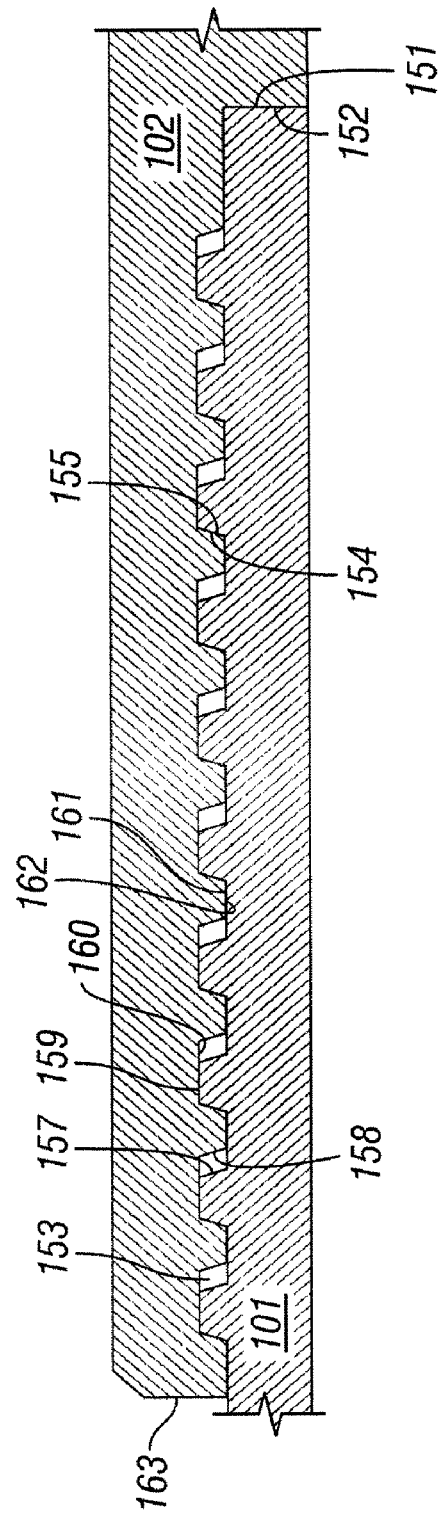
FIG. 2 shows a cross section of a prior art connection having a free-running thread.
Figure 3A:
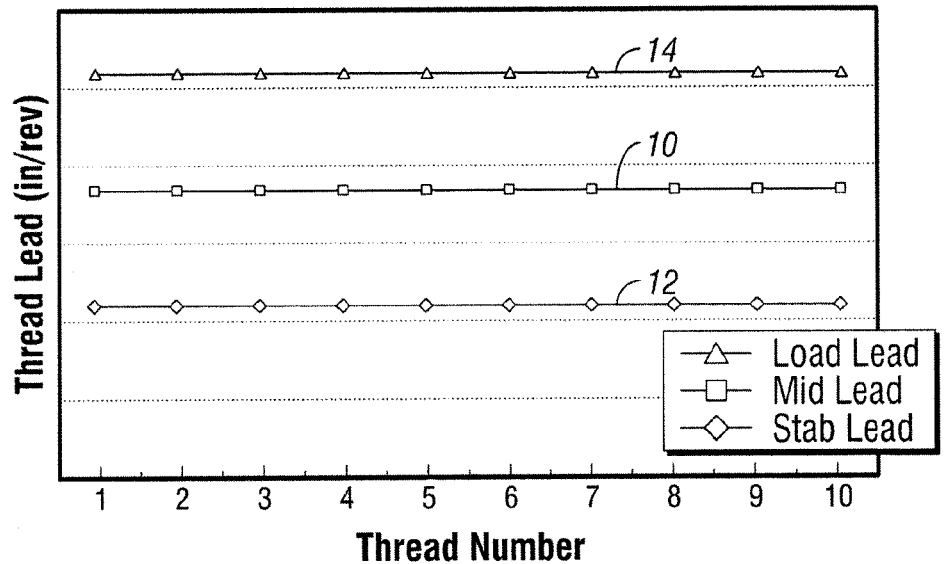
FIGS. 3A, 3B, and 3C show graphs of thread leads for prior art connections.
Figure 3B:
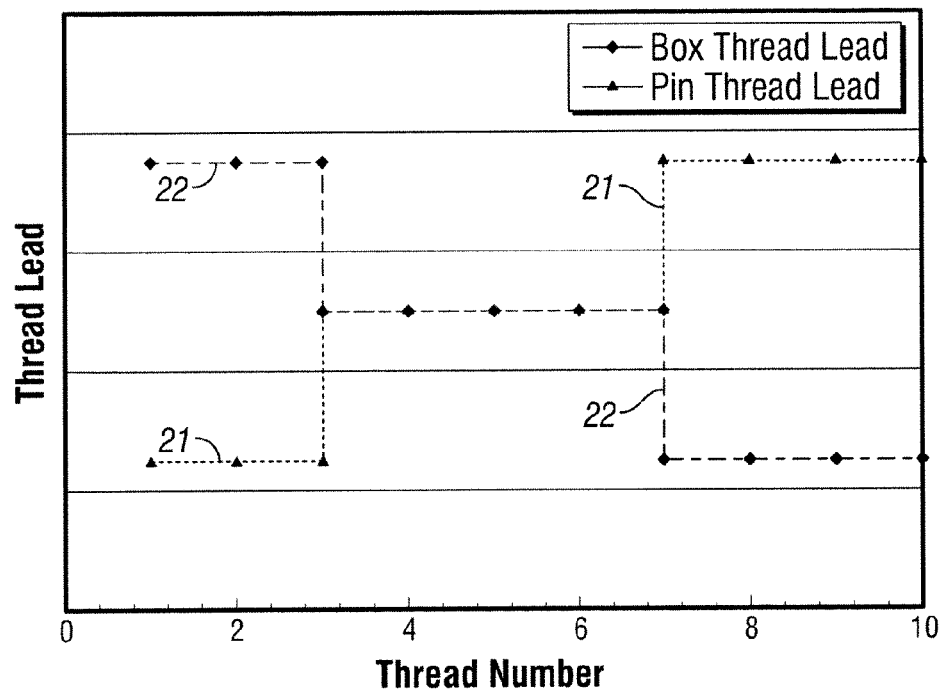
Figure 3C:
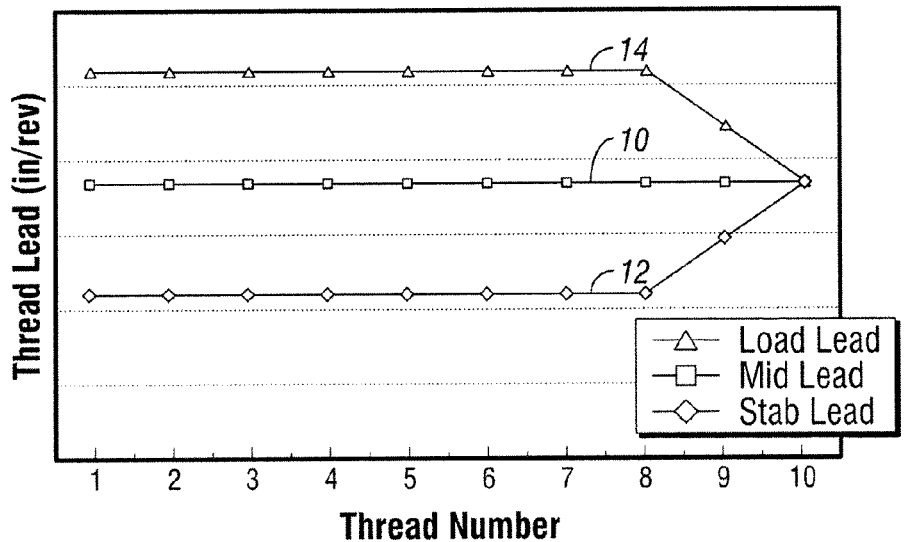

Variations in root/crest interference may be particularly useful for embodiments having free-running threads. As discussed above with respect to FIG. 2, for free-running threads to have a thread seal similar to wedge threads, prior art connections with cylindrical free-running threads would require interference between the load flanks 154 and 155 and stab flanks 157 and 158. That interference would exist substantially throughout the make-up of the connection because the pin thread and the box thread have a continuous width. Further, root/crest interference, if any, would exist substantially throughout the make-up of the connection. This could lead to galling of the threads and difficulty in making up the connection.

In one embodiment of the present disclosure, one or both of the pin member and the box member may have free-running threads with perturbations on a load flank, a stab flank, a root, and/or a crest. Preferably, the perturbations would be located such that, at one or more locations, a thread seal is formed. This may be accomplished by selecting the size and locations of the perturbations such that load flank interference, stab flank interference, and root/crest interference exist proximate to each other. Thus, free-running threads may be adapted to form threads seals in one or more embodiments of the present disclosure. By forming thread seals on only a portion of the free-running threads, the risk of galling is decreased as compared to having the flank interferences and root/crest interference exist over the entire connection. Those having ordinary skill in the art will appreciate that a perturbation on a load flank, which is loaded during make-up of the connection, may not be required to form a thread seal because of the high contact pressure inherent in the load flanks of a free-running thread.

Because of indeterminate make-up of wedge threads, it may be more desirable to have all perturbations on either the pin member or the box member. Alternatively, perturbations on the pin member and the box member may be on portions of the thread that would not contact each other (i.e. at sufficiently different axial positions such that the perturbations do not interact). For free-running threads, which typically have a positive stop torque shoulder, it may also be desirable to have perturbations on either the pin member or the box member because the relative position of the pin member and the box member is somewhat indeterminate, although to a lesser extent than wedge threads.

Those having ordinary skill in the art will appreciate that the desired amount of contact pressure created by perturbations may vary based on the pressure to be sealed, the substance to be sealed, and the material used for the connection. As discussed above, a higher contact pressure results in the ability to seal a greater pressure. Further, if gas, which is more difficult to seal than fluid, is to be sealed by the connection, a greater contact pressure may be desired. The material to be used for the connection may limit the maximum allowable contact pressure. For example, a corrosion resistant alloy (CRA) is typically more susceptible to damage from localized stress (such as that resulting from perturbations) than other high strength steels. Those having ordinary skill in the art will be able to select the desired contact pressure in view of the material to be used for the connection. Alternatively, the material may be selected in view of the desired contact pressure.

Embodiments of the present disclosure may include one or more stress relief grooves in the roots of the pin thread and/or the box thread. Such stress relief grooves are taught in U.S. Pat. No. 6,050,610 issued to Enderle et al., and assigned to the assignee of the present disclosure. That patent is incorporated herein by reference in its entirety. Enderle discloses stress relief grooves that provide an escape for trapped lubricant during make-up of the connection. Trapped lubricant may result in false torque readings, which can result in improperly made-up connections. Further, trapped lubricant may damage the connection during make-up if pressure build up within the connection occurs. This problem typically occurs in colder environments when the lubricant is more viscous and less able to escape from the connection to relieve pressure build up. It may also be exacerbated if the connection is made-up with a high speed of rotation.

One problem inherent in stress relief grooves in the roots of the pin thread and/or the box thread, which act as a pressure release, is that the stress relief grooves reduce the ability to thread seal on portions of the threads having the thread seal. Because, as disclosed by Enderle, the stress relief groove may be employed over a limited portion of the thread and in any shape, or of varying depths, the remaining portion of the thread can be used to form an internal and external pressure seal (e.g. by forming one or more perturbations on the thread). In such an embodiment, a thread seal would exist where one or more perturbations are appropriately located away from any stress relief groove.

In one embodiment, the perturbations shown in FIGS. 8 and 9 may be used instead of the stress relief grooves disclosed by Enderle. Periodic or induced thread drunkenness as shown in FIGS. 8 and 9 results in small, spaced apart pockets of reduced contact pressure or gaps along the threads. The stress relief grooves disclosed by Enderle largely function by providing an exit for excess thread dope. As an alternative, the spaced apart pockets can provide places for the lubricant to collect in the connection rather than exit the connection. The present inventor believes that the intermittent trapping of the lubricant between perturbations with increased contact pressure can provide an improved thread seal. Further, having trapped lubricant ensures that sufficient lubrication exists in the connection to aid in disconnecting the tubulars after use.

As discussed above, periodic variations from nominal dimensions occur naturally ("natural variations") during the manufacturing process. Although manufacturers take various steps to minimize the natural variations, at least some variation from nominal exists, and is acceptable if it is within a desired tolerance. Because the exact location and extent of the natural variations are unknown during manufacturing, it may be desirable that the size of the perturbations be selected such that benefits are derived despite the location of the perturbations relative to the natural variations. For example, if a particular machining setup (e.g. machine, machine tool, fixtures, material, dimensions of the part) has a typical occurrence of natural variations on the order of about +/−0.001 inch. To ensure that some benefit of the perturbations exist in the connection (rather than being cancelled out by the natural variations), the size of the perturbations may be selected to be about twice (i.e. +/−0.002 inch) the size of the natural variations.

Characteristics of the connection may affect the desired size of the perturbations. Ideally, as a metal-to-metal seal is formed (e.g. a thread seal) the surfaces coming into contact rub for a short distance causing "burnishing" of the surfaces. As used herein, "burnishing" means a slight polishing or smoothing of the surfaces. If the surfaces contact for too great of a length at too great of a contact pressure, galling may occur. Galling occurs when the lubricant is displaced from between the surfaces as sliding contact continues, resulting in an increase in friction and heat build up. To avoid undesirable galling, perturbations should be sized to prevent extended lengths of sliding contact during make-up. To form a thread seal, contact pressure between mating surfaces (e.g. load flanks, stab flanks, and roots and crests) is typically from about 25 percent to about 100 percent of the yield strength of the material. Closed thread forms (e.g. dovetailed threads) generally allow for the contact pressure to be towards the higher end of the range. Ideally, a thread seal is formed by surfaces coming together over a short distance with sharply rising contact pressure ending with the contact pressure within the effect range of forming a thread seal.

The wedge ratio of a wedge thread is a parameter that may affect the desired size of the perturbation. Essentially, the wedge ratio determines how "quickly" (i.e. over how many linear inches the surfaces contact during make-up) the surfaces come into contact. In general, larger wedge ratios allow for larger perturbations than smaller wedge ratios. In one embodiment, the size of the perturbation may be selected to be between about 0.1 and about 0.2 times the wedge ratio. For example, if the wedge ratio (difference between the load lead and the stab lead) is about 0.020 inches, the desired size of the perturbation would be between about 0.002 inch and about 0.004 inch.

Another factor to consider in selecting the size of the perturbation is the material, which can affect the susceptibility to galling. For example, CRA is more prone to galling than carbon steel. Thus, a connection made of CRA (assuming all other parameters are equal) would be more likely to have thread galling than a connection made of carbon steel having the same size perturbation. To prevent galling, the connection made of CRA may have a smaller perturbation.

While the present disclosure has been described with respect to a limited number of embodiments, those skilled in the art, having benefit of this disclosure, will appreciate that other embodiments can be devised which do not depart from the scope of the present disclosure as disclosed herein. Accordingly, the scope of the present disclosure should be limited only by the attached claims.

What is claimed is:

1. A threaded connection comprising:
 a pin member comprising a single primary pin thread having a pin thread crest, a pin thread root, a pin load flank, and a pin stab flank; and
 a box member comprising a single primary box thread having a box thread crest, a box thread root, a box load flank, and a box stab flank;
 wherein at least one of the pin thread crest and the pin thread root of the single primary pin thread and at least one of the box thread crest and the box thread root of the single primary box thread has at least one perturbation formed thereon;
 wherein upon a selected make-up of the pin member with the box member, a localized clearance or a localized interference exists between the single primary pin thread and the single primary box thread at the at least one perturbation;
 wherein the localized clearance between the single primary pin thread and the single primary box thread exists across substantially the entire pin thread crest or substantially the entire box thread crest; and wherein the localized interference between the single primary pin thread and the single primary box thread exists across substantially the entire pin thread crest or substantially the entire box thread crest.

2. The threaded connection of claim 1, wherein each of the at least one perturbation is located only on one of the single primary pin thread and the single primary box thread.

3. The threaded connection of claim 1, wherein the at least one perturbation is located such that a thread seal is formed proximate thereto.

4. The threaded connection of claim 1, wherein a localized clearance created by the at least one perturbation serves as an entrapment volume for thread compound flowing at the selected make-up.

5. The threaded connection of claim 1, wherein a plurality of perturbations is formed on one of the single primary pin thread and the single primary box thread in a substantially sinusoidal pattern.

6. The threaded connection of claim 1, wherein the at least one perturbation is between about 0.0005 inch and about 0.005 inch in size.

7. The threaded connection of claim 1, wherein the at least one perturbation is between about 0.001 inch and about 0.002 inch in size.

8. A threaded connection comprising:
a pin member comprising a single primary pin thread having a pin thread crest, a pin thread root, a pin load flank, and a pin stab flank; and
a box member comprising a single primary box thread having a box thread crest, a box thread root, a box load flank, and a box stab flank;
wherein at least one of the pin thread crest and the pin thread root of the single primary pin thread and at least one of the box thread crest and the box thread root of the single primary box thread has at least one perturbation formed thereon;
wherein upon a selected make-up of the pin member with the box member, a localized reduction in clearance or a localized increase in interference exists between the single primary pin thread and the single primary box thread at the at least one perturbation;
wherein the localized reduction in clearance between the pin thread and the single primary box thread exists across substantially the entire pin thread crest or substantially the entire box thread crest; and
wherein the localized increase in interference between the pin thread and the single primary box thread exists across substantially the entire pin thread crest or substantially the entire box thread crest.

9. The threaded connection of claim 8, wherein the at least one perturbation is located such that a thread seal is formed proximate thereto.

10. A threaded connection comprising:
a pin member comprising a single primary pin thread having a pin thread crest, a pin thread root, a pin load flank, and a pin stab flank; and
a box member comprising a single primary box thread having a box thread crest, a box thread root, a box load flank, and a box stab flank;
wherein at least one of the pin thread crest and the pin thread root of the single primary pin thread and at least one of the box thread crest and the box thread root of the single primary box thread has at least one perturbation formed thereon;
wherein upon a selected make-up of the pin member with the box member, a localized increase in clearance or a localized reduction in interference exists between the single primary pin thread and the single primary box thread at the at least one perturbation;
wherein the localized increase in clearance between the single primary pin thread and the single primary box thread exists across substantially the entire pin thread crest or substantially the entire box thread crest; and
wherein the localized reduction in interference between the single primary pin thread and the single primary box thread exists across substantially the entire pin thread crest or substantially the entire box thread crest.

11. The threaded connection of claim 10, wherein a localized increase in clearance created by the at least one perturbation serves as an entrapment volume for thread compound flowing at the selected make-up.

* * * * *